(12) United States Patent
Hotta

(10) Patent No.: US 10,480,434 B2
(45) Date of Patent: Nov. 19, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Shintaro Hotta, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 72 days.

(21) Appl. No.: 15/936,619

(22) Filed: Mar. 27, 2018

(65) Prior Publication Data
US 2018/0306132 A1   Oct. 25, 2018

(30) Foreign Application Priority Data

Apr. 24, 2017   (JP) .................................. 2017-085298

(51) Int. Cl.
| F02D 41/00 | (2006.01) |
| F02D 37/02 | (2006.01) |
| F02P 5/04 | (2006.01) |
| F02P 5/15 | (2006.01) |
| F02B 37/18 | (2006.01) |
| F02B 13/02 | (2006.01) |
| F02D 43/04 | (2006.01) |
(Continued)

(52) U.S. Cl.
CPC .......... *F02D 41/0052* (2013.01); *F02B 37/18* (2013.01); *F02D 37/02* (2013.01); *F02D 41/005* (2013.01); *F02D 41/1454* (2013.01); *F02D 41/1475* (2013.01); *F02D 41/30* (2013.01); *F02D 43/04* (2013.01); *F02P 5/045* (2013.01); *F02P 5/1516* (2013.01); *F02D 13/0226* (2013.01); *F02D 2041/001* (2013.01); *F02D 2200/08* (2013.01); *F02D 2200/101* (2013.01); *F02D 2200/1002* (2013.01); *Y02T 10/144* (2013.01)

(58) Field of Classification Search
CPC .... F02D 41/0052; F02D 37/02; F02D 41/005; F02D 41/1475; F02D 41/1454; F02D 41/30; F02D 43/04; F02D 2200/101; F02D 2200/1002; F02D 2041/001; F02D 13/0226; F02D 2200/08; F02P 5/045; F02P 5/1516; F02B 37/18; Y02T 10/144
USPC .................................................. 60/602, 605.2
See application file for complete search history.

(56) References Cited

U.S. PATENT DOCUMENTS

| 7,213,566 B1 * | 5/2007 | Jankovic ................. F02D 37/02 123/302 |
| 2006/0144356 A1 * | 7/2006 | Sellnau .................... F01L 1/185 123/90.16 |

(Continued)

FOREIGN PATENT DOCUMENTS

JP   2002-206442 A   7/2002

*Primary Examiner* — Hoang M Nguyen
(74) *Attorney, Agent, or Firm* — Sughrue Mion, PLLC

(57) ABSTRACT

Assume that a boundary on the air-fuel ration operation is changed from a boundary (i) to a boundary (ii). Then, after the boundary is changed, a high EGR operation region where a target EGR rate is set to a high value overlaps partially with a rich operation region. Therefore, when it is determined that the current operating point exists in the overlapped region, the target EGR rate is forcibly lowered. In addition, the boundary on a drive cam for an intake valve is changed from a boundary (I) to a boundary (II) thereby a region where a small cam is selected is enlarged.

3 Claims, 14 Drawing Sheets

(51) Int. Cl.
*F02D 41/30* (2006.01)
*F02D 41/14* (2006.01)
*F02D 13/02* (2006.01)

(56) References Cited

U.S. PATENT DOCUMENTS

| | | | | |
|---|---|---|---|---|
| 2012/0023935 A1* | 2/2012 | Pursifull | ................ | F02M 26/42 60/605.2 |
| 2014/0014075 A1* | 1/2014 | Yager | ................ | F02D 41/0047 123/568.11 |
| 2015/0316005 A1* | 11/2015 | Madison | ................ | F02M 26/04 60/602 |

* cited by examiner

CONTROL DEVICE FOR INTERNAL COMBUSTION ENGINE

CROSS-REFERENCE TO RELATED APPLICATION

The present disclosure claims priority under 35 U.S.C. § 119 to Japanese Patent Applications No. 2017-085298, filed on Apr. 24, 2017. The contents of these applications are incorporated herein by reference in their entirety.

TECHNICAL FIELD

The present disclosure relates to a control device for an internal combustion engine.

BACKGROUND

JP 2002-206442 A discloses an air-fuel ratio control device for an internal combustion engine. An engine which is controlled by the air-fuel ratio control device comprises an exhaust gas sensor, an exhaust gas purifying catalyst and a fuel injector. The air-fuel ratio control device performs a feedback control based on an output of the exhaust gas when the engine is operated in a first operation region. In the feedback control, a drive period of the fuel injector is controlled so that the output of the exhaust gas closes to a stoichiometry point.

The air-fuel ratio control device performs a rich operation control when the engine is operated in a second operation region. The second region is an operation region located on a higher load side or a higher engine speed side than the first region. When the engine is operated in such a high region, bed temperature of the exhaust gas purifying catalyst tend to rise easily. The rich operation control, the air-fuel ration is enriched based on an open-loop control. When the rich operation control is performed, temperature of the exhaust gas decreases due to latent heat of vaporization of excess HS. Therefore, it is possible to suppress an excessive increase in the bed temperature when the engine is operated in the second region.

The air-fuel ratio control device also continues to perform the feedback control for a while when the operating condition of the engine enters the second operation region from the first operation region. The duration of the feedback control is increased or decreased according to the duration of operation in the first operation region before entering the second operation region. The longer the operation duration, the easier the bed temperature rise after entering the second operation region. By increasing or decreasing the duration of the feedback control depending on the duration, it is possible to ensure safety against the excessive rise in the bed temperature and to keep the fuel consumption low.

The above mentioned control after entering the second operation region is translated to a temporarily control in which the first operation region is temporarily enlarged or reduced. Such a region variable control is also be expected to apply to the second operation region. This is because the longer the operation duration in the second operation region is, the easier it is for the bed temperature to rise when the operating condition enters the first operation region from the second operation region. When the region variable control is applied to the second operation region, then the second operation region is temporarily enlarged or reduced.

The present inventor is examining control based on a closing timing of an intake valve selected according to an operating condition of an engine, an ignition period of an ignition device, and EGR rate. The engine to be controlled by the control under consideration comprises two types of intake cams for driving the intake valve, a supercharged EGR system, a three-way catalyst as an exhaust gas purifying catalyst, and an ignition device.

The two types of the intake cams include a large cam whose working angle and lift amount are relatively large and a small cam whose working angle and lift amount are relatively small. The large cam is configured to close the intake valve in a first crank angle section. The first crank angle includes a crank angle at which inhalation efficiency becomes maximum under a predetermined condition. The small cam is configured to close the intake valve in a second crank angle section which is located on an advance side relative to the first crank angle section. The second crank angle includes a crank angle at which the inhalation efficiency under the predetermined condition is relatively low.

The supercharged EGR system is a system, so-called a LPL-EGR system, comprising a supercharger including an exhaust turbine and an intake compressor, and an EGR device that introduces exhaust gas on the downstream side of the three-way catalyst into the upstream side of the intake compressor.

In the control under consideration, the large cam is selected in a high EGR operation region where a target value of EGR rate (hereinafter also referred to as "target EGR rate") is set to a predetermined high value. Further, in the control under consideration, the small cam is selected in a low EGR operation region where the target EGR rate is set to a value lower than the predetermined high value. Furthermore, in the control under consideration, when the small cam is selected, an ignition period is advanced as compared with a case where the large cam is selected. According to such engine control, it is possible to improve engine output in both the high EGR operation region and the low EGR operation region.

However, the following problem is developed when the region variable control described above is performed in addition to the engine control under consideration. That is, if these two controls are performed in parallel, a rich operation region temporarily enlarged by the region variable control may overlap with the high EGR operation region under consideration. Then, excess HC is discharged from the cylinder in the overlapping region. Despite the excess HC, the three-way catalyst is not able to demonstrate its original purification capability because the engine is driven in the rich operation region. Also, in the high EGR operation region, the exhaust gas which passes through the three-way catalyst is recirculated to an intake system of the engine as external EGR gas. Therefore, during the overlapped region, deposits derived from the excess HC tend to occur in the intake system.

The present disclosure addresses the above described problem, and an object of the present disclosure is to take measure in the LPL-EGR system when the rich operation region is overlapped with the high EGR operation region.

A first aspect of the present disclosure is a control device for an internal combustion engine.

The control device is configured to control an engine.

The engine comprising:

two types of intake cams for driving an intake valve;

a turbocharger including an exhaust turbine and an intake compressor;

an exhaust gas purifying catalyst which is provided on a downstream of the exhaust turbine;

an EGR device which is configured to introduce exhaust gas on the downstream side of the exhaust gas purifying catalyst into an upstream side of the intake compressor as an external EGR gas; and an ignition device which is configured to ignite air-fuel mixture in a cylinder.

The control device is configured to, based on an operation condition of the engine which is specified by engine torque and engine speed, set a target EGR rate and a target air-fuel ratio and select from the intake cams a drive cam for the intake valve.

The control device is further configured to, when the engine is operated in a high EGR operation region where the target EGR rate is set to a predetermined high EGR rate:

select a first cam as the drive cam; and set a closing timing of the intake valve to a first crank angle section including a crank angle at which inhalation efficiency is the highest under a condition where engine speed and supercharging pressure are fixed, The control device is further configured to, when the engine is operated in a low EGR operation region where is located on a higher torque and higher engine speed side relative to the high EGR operation region and the target EGR rate is set to a lower rate than the predetermined high EGR rate:

select a second cam as the drive cam which has smaller operation angle and smaller lift amount than those of the first cam;

set the closing timing of the intake valve to a second crank angle section which is located on an advanced side relative to the first crank angle section and whose inhalation efficiency is lower than that during the first crank angle section; and change an ignition period of the ignition device to an advance period relative to the ignition period which is set when the engine is operated in the high EGR operation region.

The control device is further configured to, when the engine is operated in an operation region where the high EGR operation region is overlapped with a rich operation region where the target air-fuel is set to a rich value:

change the target EGR rate to a lower value than the predetermined high EGR rate;

select the second cam as the drive cam;

set the closing timing to the second crank angle section; and change the ignition period to the advance period.

A second aspect of the present disclosure is the control device for the internal combustion engine according to the first aspect.

The control device comprising:

an EGR map in which the high EGR operation region and the low EGR operation region are associated with the operation condition of the engine;

an air-fuel ratio map in which the rich operation region and a stoichiometric operation region where the target air-fuel ration is set to a stoichiometric ratio are associated with the operation condition of the engine; and a drive cam map in which a first cam operation region where the first cam is selected as the drive cam and a second cam operation region where the second cam is selected as the drive cam are associated with the operating condition of the engine.

The control device is further configured to:

determine, when the EGR map is superimposed on the air-fuel ratio map, whether or not the rich operation region overlaps with the high EGR operation region; and change, when it is determined that the rich operation region overlaps with the high EGR operation region, a cam boundary between the first cam operation region and the second cam operation region so that all of the rich operation region fall within the second cam operation region.

A third aspect of the present disclosure is the control device for the internal combustion engine according to the first aspect or the second aspect.

The engine further comprising a waste gate valve which is provided on a bypass pipe of the exhaust turbine.

The control device further comprising opening degree maps in which an opening degree of the waste gate valve is associated with the opening condition of the engine, wherein the opening degree maps are set for the first cam and the second cam, each of the opening degree maps includes full close lines for specifying the waste gate valve to be fully closed.

The control device is further configured to change, when it is determined that the rich operation region overlaps with the high EGR operation region, the cam boundary so that all of the rich operation region fall within the second cam operation region and also so that the cam boundary locates at a lower engine speed side relative to the full close line of the opening degree map for the second cam.

According to the first aspect, when the engine is operated in the high EGR operation region, the first cam is selected as the drive cam for the intake valve and the intake valve is closed at the first crank angle section. When the engine is operated in the high EGR operation region, the target EGR rate is set to the predetermined high rate. Therefore, in this case, a knocking limit is relatively high. Further, the first crank angle section includes the crank angle at which inhalation efficiency is the highest under the condition where engine speed and supercharging pressure are fixed. Therefore, when the first cam is selected and the intake valve is closed at the first crank angle section, it is possible to improve engine output.

Further, according to the first aspect, when the engine is operated in the low EGR operation region, the second cam is selected as the drive cam for the intake valve, the intake valve is closed at the second crank angle section and the air-fuel mixture is ignited at the advance period relative to the ignition period which is set when the engine is operated in the high EGR operation region. When the engine is operated in the low EGR operation region, the target EGR rate is set to a lower value than the case where the engine is operated in the high EGR operation region. That means the knocking limit decrease in the EGR operation region. In this respect, the second cam has smaller operation angle and smaller lift amount than those of the first cam. And the second crank angle section is located on the advanced side relative to the first crank angle section and whose inhalation efficiency is lower than that during the first crank angle section. Therefore, when the second cam is selected and the intake valve is closed at the second crank angle section, it is possible to lower the inhalation efficiency and suppress the decrease in the knocking limit. Further, when the air-fuel mixture is ignited at the advance period relative to the ignition period which is set when the engine is operated in the high EGR operation region, it is possible to compensate the decrease in the inhalation efficiency and suppress the decrease in the engine output.

Furthermore, according to the first aspect, when the engine is operated in the operation region where the high EGR operation region is overlapped with the rich operation region, the target EGR rate is changed to the lower value than the predetermined high EGR rate, the second cam is selected as the drive cam for the intake valve, the intake valve is closed at the second crank section and the air-fuel mixture is ignited at the advance period relative to the ignition period which is set when the engine is operated in the high EGR operation region. When the target EGR rate is changed to the lower value than the predetermined high EGR rate, amount of the external EGR gas is decreased. Therefore, in this case, it is possible to suppress the occurrence of deposit derived from excess HC. On the other hand, however, the knocking limit is lowered at the same time. In this respect, when the second cam is selected and the intake valve is closed at the second crank angle section, it is possible to lower the inhalation efficiency and suppress the decrease in the knocking limit. Further, when the air-fuel mixture is ignited at the advance period relative to the ignition period which is set when the engine is operated in the high EGR operation region, it is possible to compensate the decrease in the inhalation efficiency and suppress the decrease in the engine output.

According to the second aspect, when it is determined that the rich operation region overlaps with the high EGR operation region, it is possible to change the cam boundary so that all of the rich operation region fall within the second cam operation region. Therefore, it is possible to select the second cam as the drive cam for the intake valve whenever the engine is operated in the overlapped region.

According to the third aspect, it is possible to not only change the cam boundary so that all of the rich operation region fall within the second cam operation region but also change the cam boundary so that it locates at a lower engine speed side relative to the full close line of the opening degree map for the second cam. Therefore, it is possible to avoid the second cam being selected as the drive cam for the intake valve in the operation region of the lower engine speed side relative to the full close line of the opening degree map for the second cam.

DESCRIPTION OF EMBODIMENTS

Figure 1:
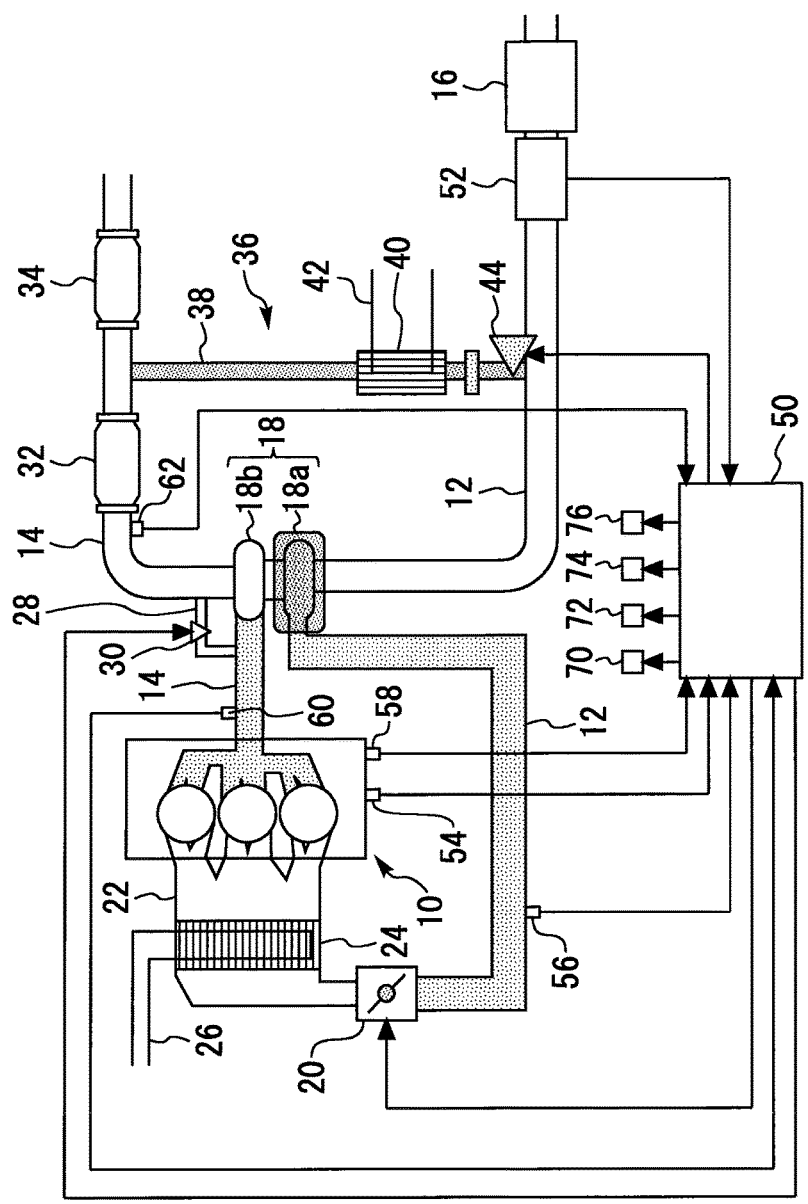
FIG. 1 is a schematic diagram for showing a configuration example of a system according to a first embodiment of the present disclosure.

Hereinafter, embodiments of the present disclosure are described based on the drawings. It is to be noted that common elements in each figure are designated by the same reference numerals, and duplicated description thereof are omitted herein. It is also to be noted that the following embodiments do not limit the present disclosure.

First Embodiment

A first embodiment of the present disclosure is described with reference to FIGS. 1 to 14.

Description of System Configuration Example

FIG. 1 is a schematic diagram illustrating a configuration example of a system according to the first embodiment of the present disclosure. The system illustrated in FIG. 1 is a system for an internal combustion engine mounted in a vehicle. The system illustrated in FIG. 1 includes an internal combustion engine (hereinafter referred to as an "engine") 10 as a driving source. The engine 10 is a four-stroke reciprocating engine, and also an in-line three cylinder engine. It is to be noted that the number and arrangement of cylinders of the engine 10 are not particularly limited to the above-described number and arrangement. The geometric compression ratio of the engine 10 is relatively high 11 or more. Each cylinder of the engine 10 communicates with an intake pipe 12 and an exhaust pipe 14.

An intake system of the engine 10 is described. An air cleaner 16 is attached in the vicinity of an inlet of the intake pipe 12. A compressor 18a of a turbocharger 18 is provided downstream of the air cleaner 16. The compressor 18a is driven to compress intake air by rotation of a turbine 18b that is provided in the exhaust pipe 14. An electronic control throttle valve 20 is provided downstream of the compressor 18a. An intake manifold 22 that is connected to intake ports of each cylinder is provided downstream of the throttle valve 20. A water-cooled type intercooler 24 is incorporated in the intake manifold 22. Intake air flowing in the intercooler 24 is cooled by heat exchange with cooling water flowing in a cooling pipe 26.

Next, an exhaust system of the engine 10 is described. The turbine 18b of the turbocharger 18 is attached to the exhaust pipe 14. The turbine 18b is connected to the compressor 18a. The turbine 18b is rotated by energy of exhaust gas flowing in the exhaust pipe 14. A bypass pipe 28 that bypasses the turbine 18b is provided in a middle of the exhaust pipe 14. A WGV (waste gate valve) 30 is provided in the bypass pipe 28. The WGV 30 is opened when an exhaust pipe pressure (back pressure) on an upstream side of the turbine 18b is higher than a predetermined value. When the WGV 30 is opened, a part of exhaust gas flowing in the upstream side of the turbine 18b flows into the downstream side of the turbine 18b through the bypass pipe 28. Catalysts 32 and 34 for cleaning exhaust gas are provided in the downstream side of the turbine 18b.

Next, an EGR system for the engine 10 is described. The engine 10 includes an LPL-EGR (low pressure loop-EGR) device 36. The LPL-EGR device 36 includes an EGR pipe 38 that connects the exhaust pipe 14 between the catalysts 32 and 34, and the intake pipe 12 on the upstream side of the compressor 18a. A water-cooled type EGR cooler 40 is provided in the middle of the EGR pipe 38. Exhaust gas flowing in the EGR cooler 40 (i.e., external EGR gas) is cooled by heat exchange with cooling water flowing in a cooling pipe 42. An electronic control EGR valve 44 is provided on the downstream side of the EGR cooler 40. A change of an opening degree of the EGR valve 44 causes a change of a flow amount of the external EGR gas that flows from the EGR pipe 38 into the intake pipe 12. When the opening degree of the EGR valve 44 becomes larger, an EGR rate (a rate of the external EGR gas to the intake air, the same shall apply hereinafter) increases.

Figure 2:
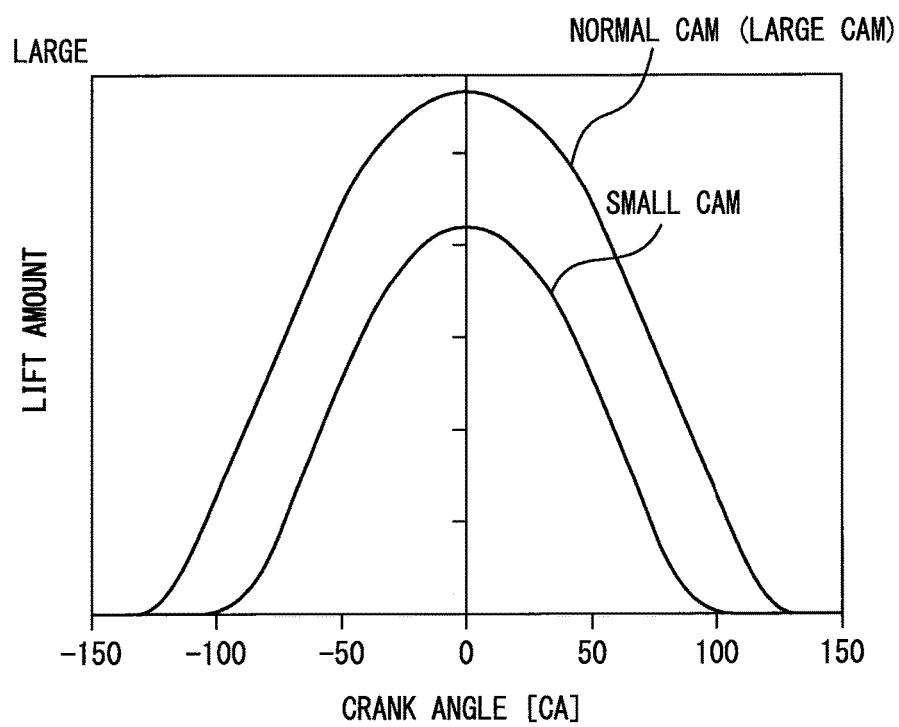
FIG. 2 is an exemplary graph describing cam profiles of two types of intake cams that are provided in the system according to the first embodiment of the present disclosure.

Next, a valve system for the engine 10 is described. FIG. 2 is an exemplary graph describing cam profiles (meaning at least one of a lift amount and an operating angle, the same shall apply hereinafter) of two types of intake cams that are provided in the system according to the first embodiment of the present disclosure. As illustrated in FIG. 2, the system according to the first embodiment includes a small cam and a normal cam as the two types of intake cams. The small cam has an operating angle and a lift amount that are smaller than those of the large cam. The normal cam (hereinafter referred to as a "large cam") and the small cam are carried on a camshaft that rotates in synchronization with a crankshaft. Two pair of large and small cams are carried on one cylinder because two intake valves are provided per cylinder. However, the number of intake valves per cylinder in the present disclosure may be one, or three or more.

The camshaft carrying the large cam and the small cam is provided with a VVT 74 (variable valve timing mechanism). The VVT 74 is a mechanism that varies a rotational phase difference of the camshaft with respect to the crankshaft thereby to vary a valve opening characteristic of the intake valve. The VVT 74 includes a housing that is connected to the crankshaft through a timing chain or the like, and a vane body that is provided in the housing and attached to an end portion of the camshaft. Hydraulic pressure is supplied into a hydraulic chamber partitioned by the housing and the vane body, to thereby enable the vane body to be relatively rotated with respect to the housing, and further enable the rotational phase difference of the camshaft with respect to the crankshaft to be varied. The hydraulic pressure supplied to the VVT 74 is controlled by a hydraulic pressure control valve provided in a hydraulic pressure supply line. A system of the VVT 74 is known, and a configuration of the system is not limited in the present disclosure, and thus the further descriptions of the VVT 74 are omitted.

Returning to FIG. 1, the configuration example of the system is continuously described. The system illustrated in FIG. 1 includes an ECU (Electronic Control Unit) 50 as a control device. The ECU 50 includes a RAM (Random Access Memory), a ROM (Read Only Memory), a CPU (microprocessor) and the like. The ECU 50 takes in and processes signals from various sensors mounted in a vehicle. The various sensors include an air flow meter 52, a crank angle sensor 54, a supercharging pressure sensor 56, a back pressure sensor 58 and an air-fuel ratio sensor 60. The air flow meter 52 is provided in the vicinity of the air cleaner 16, and detects an intake air amount. The crank angle sensor 54 outputs a signal according to a rotation angle of the crankshaft. The supercharging pressure sensor 56 detects an intake pipe pressure (supercharging pressure) on the upstream side of the throttle valve 20. The back pressure sensor 58 detects an exhaust pipe pressure (back pressure) on the upstream side of the turbine 18b. The air-fuel ratio sensor 60 detects an air-fuel ratio of the exhaust gas flowing on the upstream of the catalyst 32.

The ECU 50 takes in and processes the signals from the various sensors to operate various actuators in accordance with a predetermined control program. The various actuators include the above-described throttle valve 20 and WGV 30. The various actuators also include injectors 70 each of which injects fuel into each cylinder and an ignition devices 72 each of which ignites an air-fuel mixture in each cylinder. The various actuators include the VVT 74 and a cam switching mechanism 76 which switch an intake cam for driving the intake valve (hereinafter also referred to as "drive cam") between the large cam and the small cam.

[Premise Engine Control of the First Embodiment (Hereinafter Also Referred to as "Premise Engine Control")]

Figure 3:
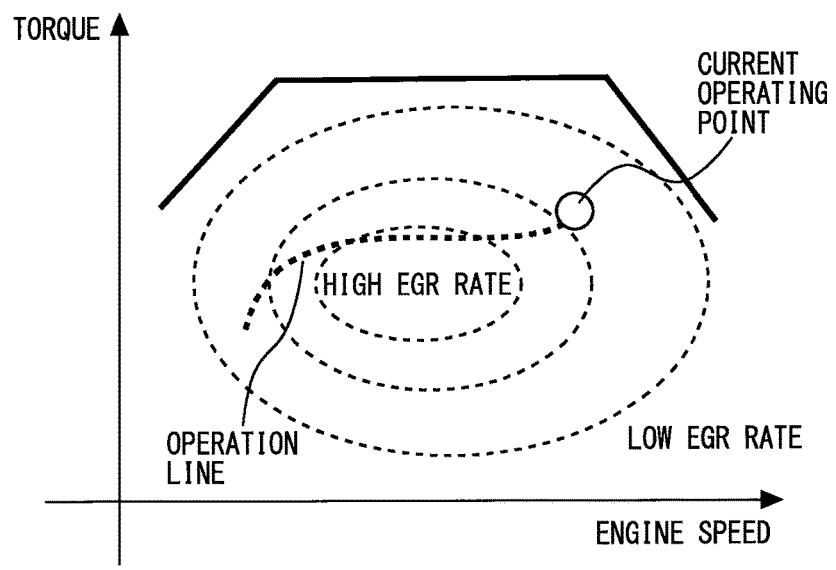
FIG. 3 is an exemplary graph for showing a relationship between an engine operating range and a target EGR rate.

FIG. 3 is an exemplary graph for showing a relationship between an engine operating range and a target EGR rate. The relationship in FIG. 3 is created based on a simulation performed in advance. As indicated contour lines in FIG. 3, the target EGR rate is set to the highest value in a partitioned range including a middle-torque-and-middle-engine-speed range. Since the middle-torque-and-middle-engine-speed range is used frequently, when the EGR rate of the frequent range is set to the highest value, heat efficiency of the engine is improved. Also, the target EGR rate is set to a lower value in the partitioned range which is not used frequently. Specifically, the target EGR rate is set to a lower value in the partitioned ranges including a high torque range and a low torque range compared with a value in the partitioned ranges including a middle torque range. Similarly, the target EGR rate is set to a lower value in the partitioned ranges including a high engine speed range and a low engine speed range compared with a value in the partitioned ranges including a middle engine speed range. In the first embodiment, the relationship shown in FIG. 3 is stored in the ROM of the ECU as a map. An opening degree of the EGR valve is controlled by applying an actual operating condition of the engine to the map.

Figure 4:
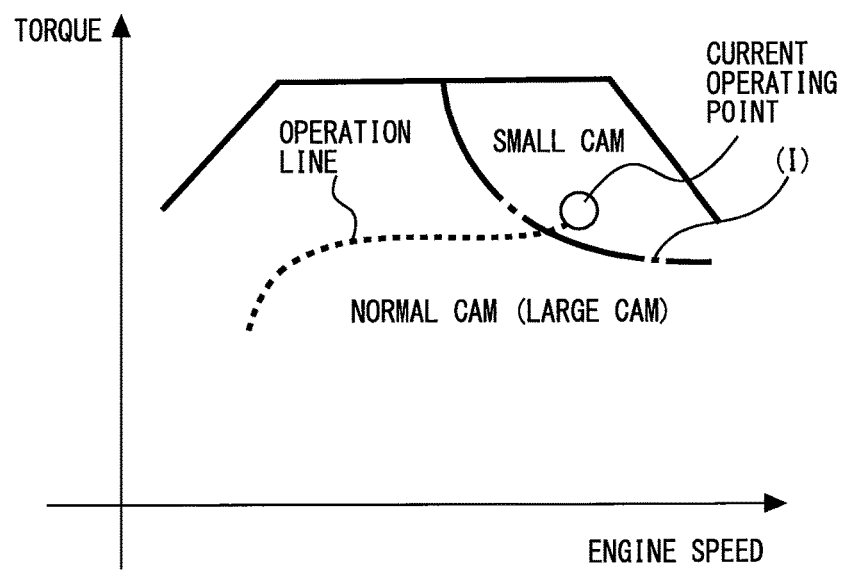
FIG. 4 is an exemplary graph for showing a relationship between the engine operating range and the cam for driving the intake valve.

In the first embodiment, the engine is controlled by combining an intake valve closing timing with the above-described target EGR rate. FIG. 4 is an exemplary graph for showing a relationship between the engine operating range and the cam for driving the intake valve. As shown in FIG. 4, the large cam is selected in many operating range. The small cam is selected only in the high-torque-and-high-engine-speed range. In the first embodiment, the relationship shown in FIG. 4 is stored in the ROM of the ECU as a map. A switching control of the cam switching mechanism is controlled by applying the actual operating condition of the engine to the map.

Figure 5:
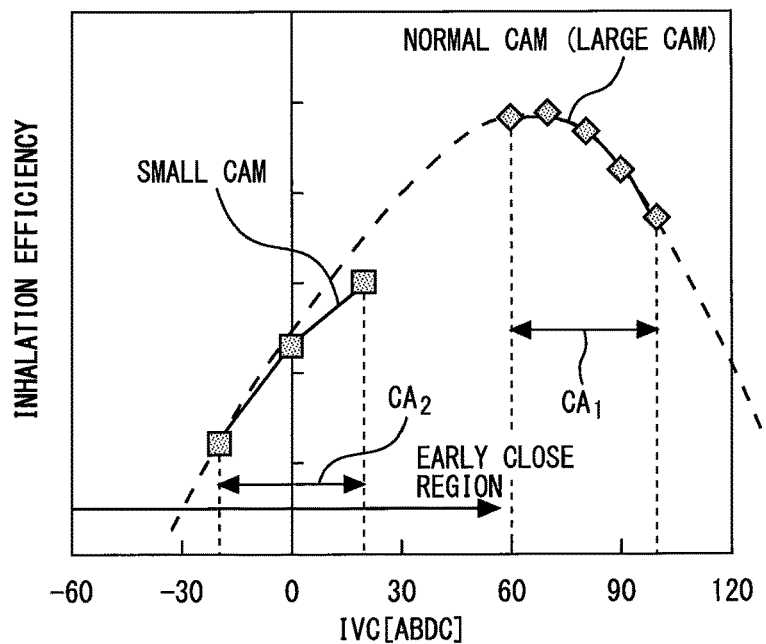
FIG. 5 is an exemplary graph for describing an intake valve closing timing.

FIG. 5 is an exemplary graph for describing an intake valve closing timing. As shown in FIG. 5, when the large cam is selected as the drive cam, the intake valve is closed in a crank angle section $CA_1$ in a retard side relative to a bottom dead center (ABDC=0). On the other hand, when the small cam is selected as the drive cam, the intake valve is closed in a crank angle section $CA_2$ in an advance side relative to the bottom dead center. The crank angle section $CA_1$ or $CA_2$ has a predetermined width. This is because the intake valve closing timing is changed by the VVT within these sections. However, to increase the engine output, the crank angle section $CA_1$ is set so as to include a crank angle at which inhalation efficiency is maximized. On the other hand, the crank angle section $CA_2$ is set so as not to include the crank angle at which the suction efficiency is maximized. It is to be noted that the inhalation efficiency can be obtained under operating conditions in which the engine speed and the supercharging pressure are fixed, for example.

In FIG. 5, the small cam is selected as the drive cam in the high-torque-and-high-engine-speed region. This is because that knocking tends to occur when the large cam is selected as the drive cam in the operation region. The knocking is likely to occur in the medium to high torque range. However, as described with FIG. 3, the target EGR rate is set to the highest value in the medium-torque-and-medium-engine-speed region. This means that a knocking limit is increased. Further, as shown in FIG. 3, the target EGR rate is set to a lower value in the high-torque-and-high-engine-speed region than that in the medium-torque-and-medium-engine-speed region. Therefore, when the operating condition of the engine shifts as shown in the operation line in FIG. 3, the target EGR rate gradually increases and reaches the maximum value, then turns to decrease. Therefore, when the large cam is continuously selected over these regions, actual compression ratio will continue to be high value despite the decrease in the knocking limit associated with the decrease in the target EGR rate. In such a case, the ignition period has to be retarded and the reduction of engine output cannot be avoided.

In this respect, in the first embodiment, since the small cam is selected as the drive cam in the high-torque-and-high-engine-speed region, it is possible to reduce the inhalation efficiency by eliminating the state where the actual compression ratio is high. Therefore, it is possible to avoid lowering the knocking limit and also avoid delaying the ignition period. In addition, when the large cam is selected as the drive cam in the high-torque-and-high-engine-speed region, the back pressure tends to exceed a specified value. In such a case, the WGV has to be opened to decrease the back pressure. However, when the drive cam is switched to the small cam, the inhalation efficiency decreases intentionally and the back pressure drops below the specified value. Therefore, it is possible to raise the supercharging pressure to compensate for the decrease in the inhalation efficiency due to the selection of the small cam. Therefore, it is possible to improve the engine output.

Figure 6:
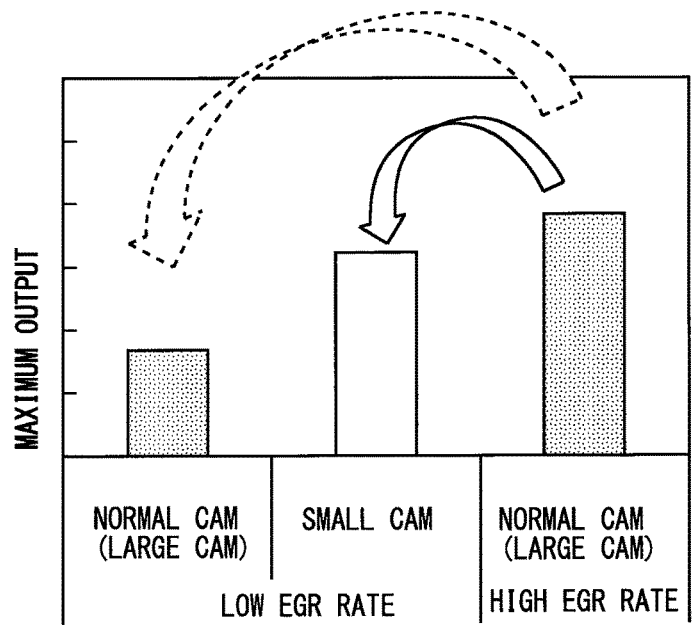
FIG. 6 is a diagram for illustrating an effect of an engine control which is the premise of an engine control of the first embodiment.

FIG. 6 is a diagram for describing an effect of the premise engine control. As shown with a broken line arrow, when the large cam is continuously selected before and after the decrease in the EGR rate, the maximum output of the engine decreases after the decrease in the EGR rate. On the other hand, as shown with a solid line arrow, since the premise engine control switches the drive cam from large to small when the EGR rate decreases, it is possible to suppress the decrease in the maximum output of the engine. Note that the value of the decreased target EGR rate may be zero or may be larger than zero.

Figure 7:
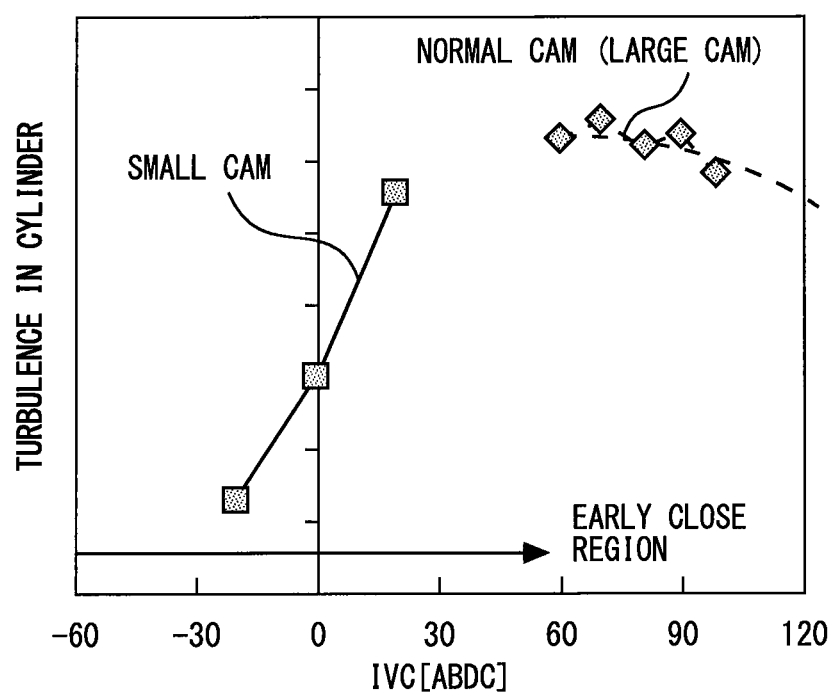
FIG. 7 is a diagram for showing an example of a relationship between closing timing of an intake valve and turbulence in a cylinder.

Incidentally, when the drive cam is switched from large to small and the intake valve closing timing is changed, combustion speed is decreased as well as the inhalation efficiency. FIG. 7 is a diagram for showing an example of a relationship between the closing timing of the intake valve and turbulence in a cylinder. As shown in FIG. 7, when the small cam is used as the drive cam, the turbulence in the cylinder becomes smaller than a case where the large cam is used as the drive cam. Thus, when the drive cam is switched from large to small, the combustion speed is decreased and the engine output may decrease. In this respect, in the engine of the first embodiment with a high geometric compression ratio, the decrease in the engine output is suppressed because the above mentioned compensation by the supercharging pressure associated with the decrease in the inhalation efficiency is more strongly influenced than the decrease in the combustion speed (see FIG. 6). Note that, in a case of a normal engine with a geometric compression ratio of about 10, the decrease in the combustion speed is strongly influenced to cause the decrease in the engine output easily.

Figure 8:
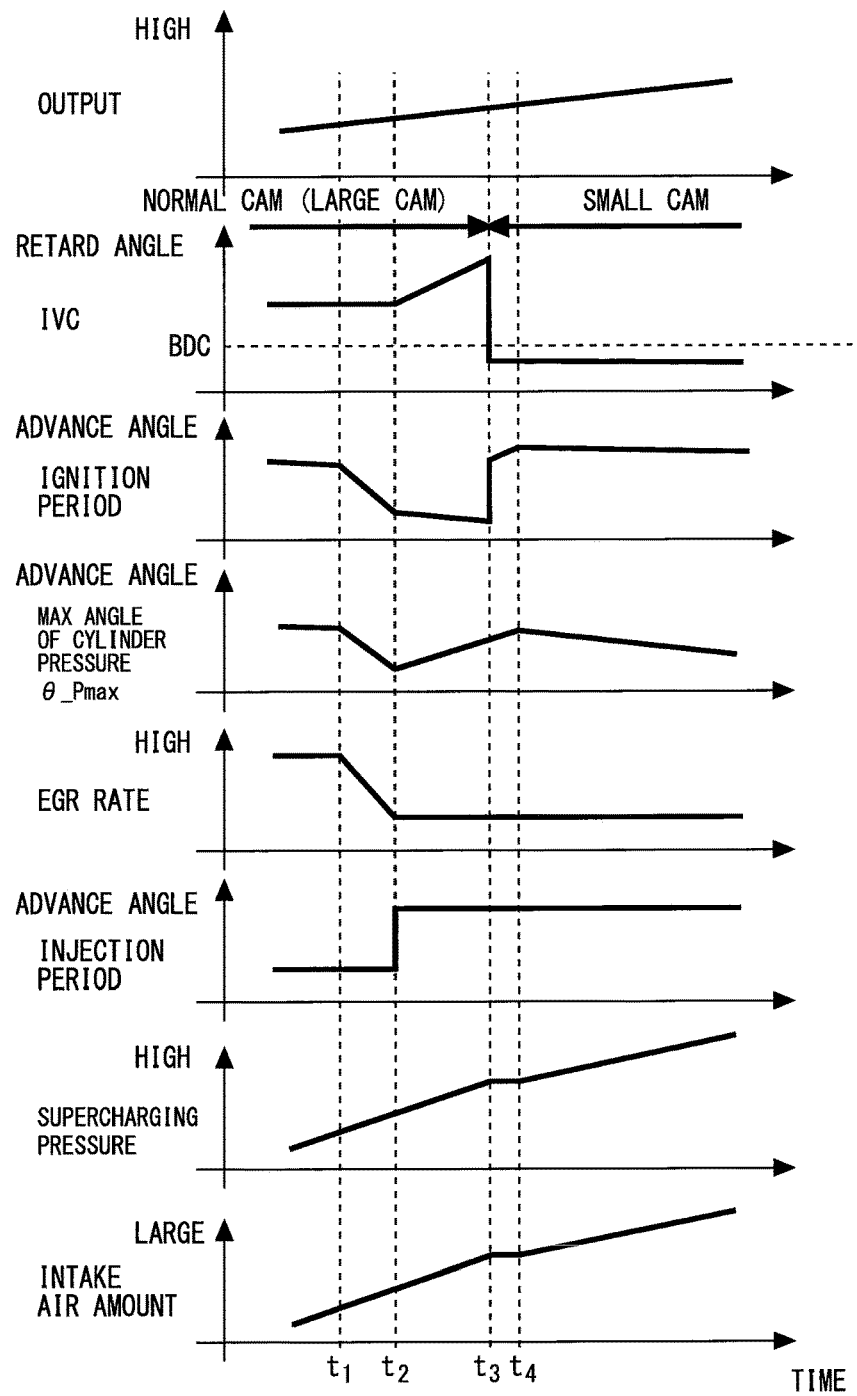
FIG. 8 is a time chart for describing an engine control example which is the premise of the engine control of the first embodiment.

Next, a specific example of the premise engine control is described with reference to FIG. 8. FIG. 8 is a time chart for describing the premise engine control example. In the time chart shown in FIG. 8, transition of various physical quantities and control parameters are drawn when the operating condition of the engine transfers from a low EGR rate region (i.e., the high-torque-and-high-engine-speed region) to a high EGR rate region (i.e., the medium-torque-and-medium-engine-speed region) in accordance with the operation line shown in FIG. 3. As shown in FIG. 8, when the operating condition of the engine transfers at time t1, the EGR rate starts to decrease while the supercharging pressure and the intake air amount in the cylinder continue to rise substantially.

As shown in FIG. 8, the EGR rate continues to decrease from time t1 to time t2. This is because that the opening degree of the EGR valve is controlled to a close side in response to the decrease in the target EGR rate described with reference to FIG. 3. When the EGR rate decreases, the knocking limit also decreases. Then, the ignition period is continuously changed to the retard side during the change in the EGR rate. Further, when the ignition period is changed to the retard side, a crank angle θ_Pmax at which pressure in the cylinder becomes maximum moves to the retard side.

In the premise engine control, the switch of the drive cam is not performed during the change in the EGR rate. This is because that the switch of the drive cam from large to small is performed in parallel with the change in the opening degree of the EGR valve, combustion state tends to unstable and torque fluctuation is increased. In addition, the switch of the drive cam is not started even at time t2 at which the change in the EGR rate is completed. The switch of the drive cam is set in a standby state until time t3. Instead of switching the drive cam, a fuel injection period is changed to the advance side at time t2. The injection period is changed from a crank angle within the compression stroke to a crank angle within the intake stroke. The reason for this is that when the large cam is selected as the drive cam, the turbulence in the cylinder is ensured and the engine output is improved, whereas the turbulence decreases when the drive cam is switched to the small cam. In this respect, when the injection period is changed at time t2 to the crank angle during the intake stroke, mixing of intake air and fuel is promoted. Therefore, it is possible to suppress the decrease in the engine output.

Figure 9:
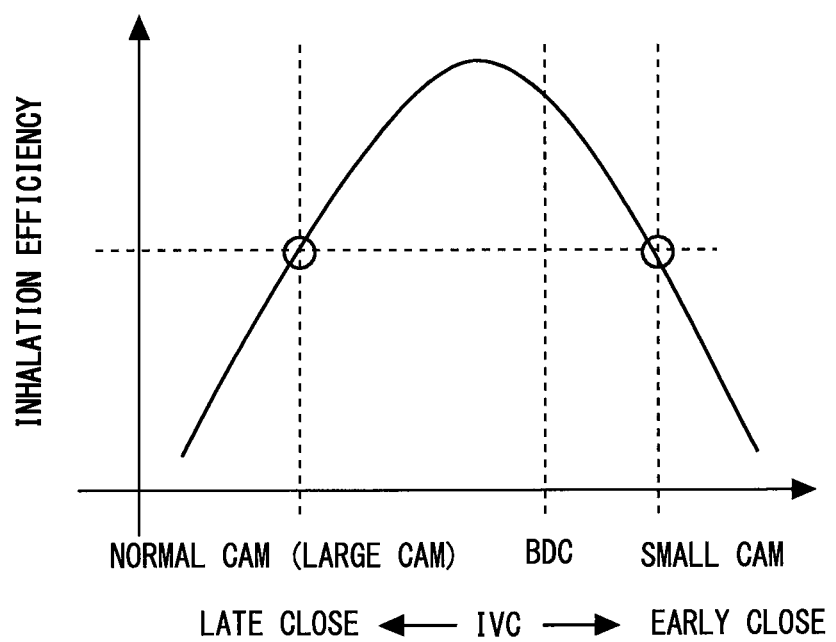
FIG. 9 is a diagram for illustrating an example of a relationship between the intake valve closing timing and inhalation efficiency.

In the premise engine control, moreover, the intake valve closing timing is started change to the retard side at time t2. The change in the intake valve closing timing is performed by controlling the hydraulic pressure control valve of the VVT while the large cam is selected as the drive cam so that the inhalation efficiency matches before and after the switch of the drive cam. FIG. 9 is a diagram for illustrating an example of a relationship between the intake valve closing timing and the inhalation efficiency. As shown in FIG. 9, the inhalation efficiency shows a characteristic of being substantially symmetric about a crank angle near the bottom dead center. Due to the supercharging pressure, however, the crank angle of the symmetric center does not match the bottom dead center. At the design stage of the intake cam, a working angle difference between the large cam and the small cam is already known. Therefore, based on the characteristics shown in FIG. 9, it is possible to specify the intake valve closing timing at which the inhalation efficiency matches before and after the switch of the drive cam.

The switch of the drive cam is started at time t3 at which the change of the intake valve closing timing by the VVT is completed. This is because that the switch of the drive cam from large to small is performed in parallel with the change in the injection period or the change in the intake valve closing timing, combustion state tends to unstable and torque fluctuation is increased. In addition, at time t3, the ignition period is changed to the advance side. The advance degree of the ignition period at time t3 is set to a value such that the crank angle θ_Pmax at which the pressure in the cylinder becomes maximum is substantially equal to crank the angle θ_Pmax at time t1. However, the ignition period at time t3 is changed to the advance side relative to the ignition period at time t1. Such advancement change of the ignition period compensates for the decrease in the inhalation efficiency and the combustion speed associated with the switch of the drive cam. Therefore, the engine output is suppressed from lowering.

As described above, when the small cam is selected as the drive cam in the high-torque-and-high-engine-speed region, it is possible to suppress the decrease in the knocking limit. Therefore, the ignition period which was changed at time t3 continues to be further changed to the advance side from time t3 for a while. Also, after time t4 at which the switch of the drive cam is completed, the opening degree of the WGV decreases with the intentional decrease in the inhalation efficiency. Therefore, the supercharging pressure that has been on the upward trend until time t3 further increases after time t4. Also, as the supercharging pressure rises after time t4, intake air amount in the cylinder also increases. Therefore, as shown in the uppermost stage of FIG. 8, the engine output continues to rise before and after the switch of the drive cam from large to small.

Feature of Engine Control of First Embodiment

Figure 10:
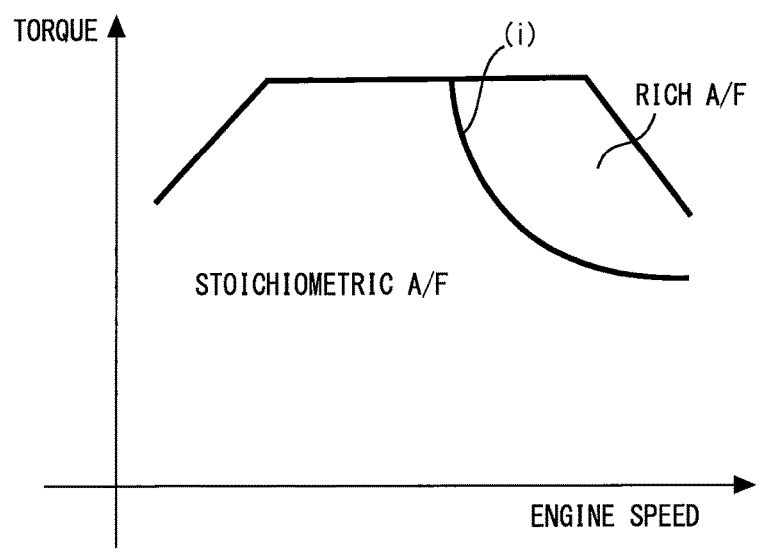
FIG. 10 is a diagram for showing an example of a relationship between an operation region of an engine and a target air-fuel ratio.

In the first embodiment, in addition to the above-mentioned premise engine control, an air-fuel ratio control is performed. In the air-fuel ratio control, a target air-fuel ratio (a target value of an air-fuel ratio) is set in accordance with to the operating condition of the engine. FIG. 10 is a diagram for showing an example of a relationship between the operation region of the engine and the target air-fuel ratio. As shown in FIG. 10, the target air-fuel ratio is set to a stoichiometric ratio in many operation regions. The target air-fuel ratio is set to rich ratio in high-torque-and-high-engine-speed region. The reason for this is that when the operating condition of the engine is in the high-torque-and-high-engine-speed region, the bed temperature of the catalyst tends to rise. In this respect, by setting the target air-fuel ratio in such an operation region to the rich ratio, it is possible to suppress excessive increase in bed temperature due to latent heat of vaporization of excess HC. Since such an air-fuel ratio control is known, further explanation on the air-fuel ratio control will be omitted.

However, in the air-fuel ratio control of this first embodiment, a rich operation region shown in FIG. 10 is enlarged or reduced. For example, when an engine control to detect the knocking (KCS control) is performed in addition to the air-fuel ratio control, the ignition period is retarded when the knocking is detected. Also, the ignition period may be retarded when a torque control is performed in addition to the air-fuel ratio control. When the ignition period is retarded, the temperature of the exhaust gas tends to rise easily. The situation where the temperature of the exhaust gas tends to rise occurs also in a case where vehicle speed wind (air flow due to vehicle running) is insufficient or when a high load operation for the engine continues for a long time. In consideration the above, in the first embodiment, the relationship shown in FIG. 10 is stored as a control map in the ROM of the ECU. Further, in the first embodiment, when the temperature of the exhaust gas is equal to or higher than a threshold value, the relationship shown in FIG. 10 is changed so that the rich operation region is enlarged.

Figure 11:
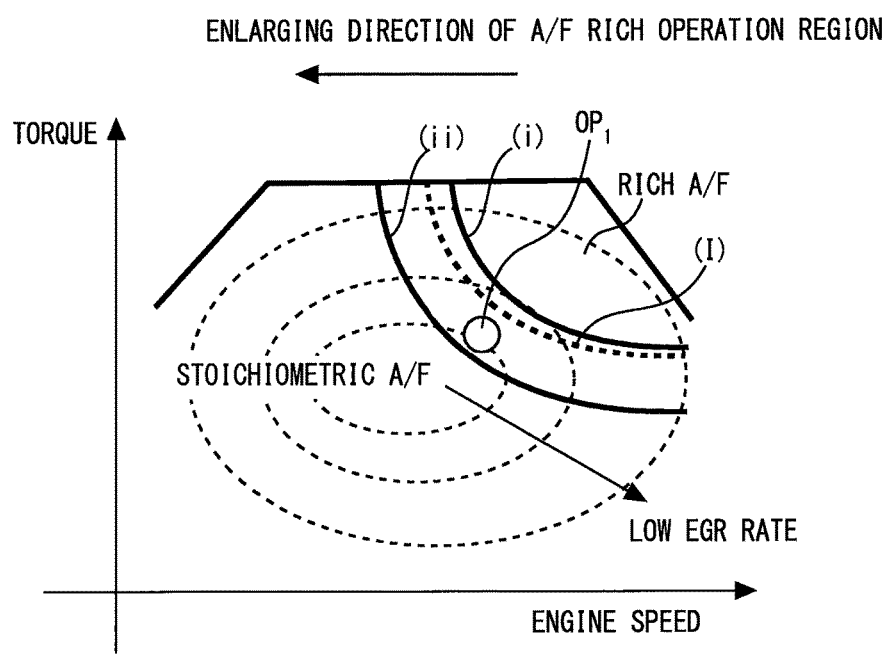
FIG. 11 is a diagram for describing a problem when a rich operation region described with reference to FIG. 10 is enlarged.

FIG. 11 is a diagram for describing a problem when the rich operation region described with reference to FIG. 10 is enlarged. In FIG. 11, a boundary (i) and a boundary (ii) related to the air-fuel ratio operation described with reference to FIG. 10 are drawn with solid lines. In FIG. 11, contour lines of the target EGR rate which were described in FIG. 3 and a boundary (I) related to the drive cam which were described in FIG. 4 are drawn with broken lines. That is, FIG. 11 corresponds to a drawing in which FIGS. 3, 4 and 10 are overlapped. As shown in FIG. 11, the boundary (I) is located between the boundary (i) and the boundary (ii). Here, it is assumed that the boundary related to the air-fuel ratio operation has been changed from the boundary (i) to the boundary (ii). Then, after the change in the boundary related to the air-fuel ratio, a region where the target EGR rate is set to a high value (hereinafter also referred to as a "high EGR operation region") overlaps partially with the rich operation region.

After the boundary related to the air-fuel ratio is changed, when the current operating point reaches an operating point OP1, the large cam is selected as the drive cam, the target EGR rate is set to a relatively high value, and the rich operation is performed. When the rich operation is carried out, excess HC for lowering the temperature of the exhaust gas is discharged from the cylinder. However, during the rich operation, the three-way catalyst cannot demonstrate its original purification capability. Nonetheless, in the operating point OP1, the target EGR rate is set to the relatively high value. Then, the exhaust gas including the excess HC passes through the three-way catalyst and flows into the upstream of the compressor as the external EGR gas. Therefore, while the rich operation is performed at the operating point OP1, a deposit derived from the HC tends to occur in the intake system of the engine.

Therefore, in this first embodiment, it is determined whether the current operating point exists in a region where the high EGR operation region overlaps with the rich operation region (hereinafter also referred to as an "overlapped region"). Then, when it is determined that the current operating point is present in the overlapped region, the target EGR rate is forcibly lowered. That is, the target EGR rate is forcibly reduced without being based on the relationship shown in FIG. 3. When the target EGR rate is forcibly reduced, amount of the external EGR gas decreases. Thus, amount of the excess HC flows into the upstream of the compressor can be reduced. Therefore, it is possible to suppress the occurrence of the deposit described above. The value of the decreased target EGR rate may be zero or may be larger than zero.

Figure 12:
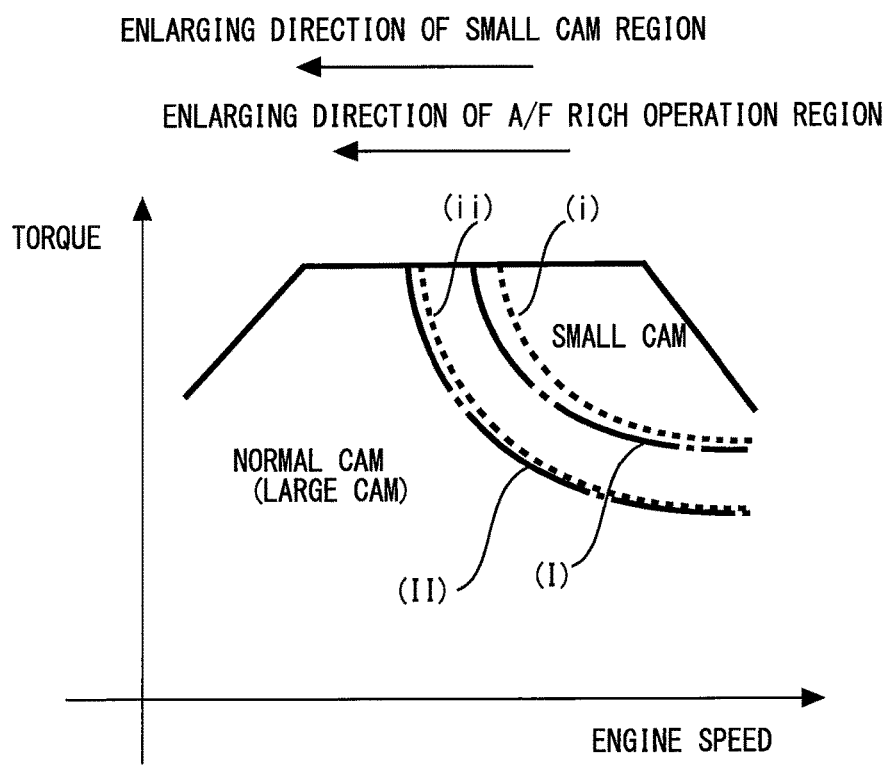
FIG. 12 is a diagram for describing a boundary changing method for drive cam.

In this first embodiment, in addition to the engine control for forcibly decreasing the target EGR rate, an engine control is performed in which the relationship described with reference to FIG. 4 is changed so that a region for selecting the small cam as the drive cam (hereinafter also referred to as a "small cam region") is enlarged. Such engine control is described with reference to FIG. 12. FIG. 12 is a diagram for describing a boundary changing method for the drive cam. In FIG. 12, the boundary (i) and the boundary (ii) described in FIG. 11 are drawn with broken lines, and the boundary (I) is drawn with a dashed line. The positional relationship between boundary (i), boundary (ii) and boundary (I) is the same as that in FIG. 11. In the first embodiment, when it is determined that the current operating point is within the overlapped region, the boundary on the drive cam is changed from the boundary (I) to the boundary (II). Then, a positional relationship between the boundary (II) and the boundary (ii) becomes the same as the positional relationship between the boundary (I) and the boundary (i).

As described above, in the engine control of the first embodiment, the positional relationship among the boundaries (i.e., the boundaries (I) and (II) for the drive cam and the boundaries (i) and (ii) for the air-fuel ratio operation) is maintained before the after the changes in these boundaries. By maintaining the positional relationship among the boundaries in this way, it is possible to fit the rich operation region inside the small cam region. Therefore, the small cam is surely selected as the drive cam when the engine control in which the target EGR rate is forcibly reduced. As described in the explanation of the premise engine control, when the drive cam is switched from large to small, it is possible to reduce the inhalation efficiency intentionally and to raise the supercharging pressure. Therefore, according to the engine control of the first embodiment, it is possible to suppress the occurrence of the deposit while suppressing the reduction of the output of the engine.

Figure 13:
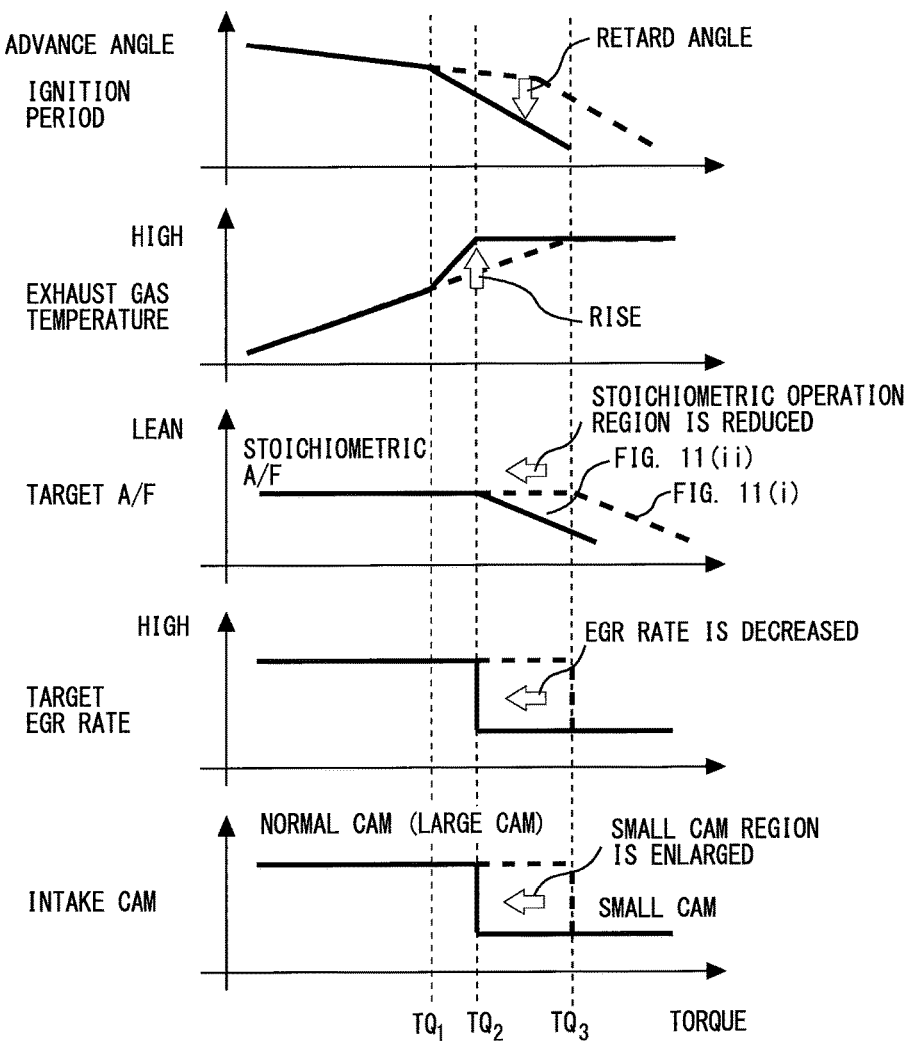
FIG. 13 a diagram for describing an engine control example of the first embodiment.

A specific example of the engine control of the first embodiment will be described with reference to FIG. 13. FIG. 13 is a diagram for describing an engine control example of the first embodiment. FIG. 13 shows the transition of various physical quantities and control parameters when operating condition of the engine shifts in the torque increasing direction under the operating condition where the engine speed is fixed. In the example shown in FIG. 13, the premise engine control, the air-fuel ratio control and the KCS control are appropriately performed in parallel with the engine control of the first embodiment.

The broken line in FIG. 13 shows an example of an engine control when the knocking is not detected while torque is rising. When the knocking is not detected while the torque is rising, the ignition period is retarded due to the rise in torque, and accordingly the temperature of the exhaust gas rises at a constant rate. In this broken line example, however, it is not detected that the temperature of the exhaust gas is likely to rise. In such a case, therefore, there is no change in the boundary (see boundary (i) in FIG. 10) concerning the operation of the air-fuel ratio, and only the premise engine control is performed. According to the premise control, the EGR rate is reduced when torque is increased from torque TQ1 to torque TQ2, and the drive cam is switched from large to small.

The solid line in FIG. 13 shows an example of an engine control when the knocking is detected while torque is rising. When the knocking is detected, the ignition period is retarded by the KCS control. Therefore, the ignition period is largely retarded in combination with the ignition period retardation accompanying the rise in torque. The temperature of the exhaust gas increases greatly on the higher torque side than the torque TQ1 because the ignition period is largely retarded. In this solid line example, it is detected that the temperature of the exhaust gas is likely to rise. Therefore, the boundary on the air-fuel ratio operation is changed, and the rich operation region enlarges. When the rich operation region is enlarged, the stoichiometric operation region reduces.

When the rich operation region is enlarged and it is determined that the current operating point is in the overlapped region, the engine control of the first embodiment is performed. In the solid line example of FIG. 13, it is determined that the current operating point is in the overlapped region when the torque increases to torque TQ3 (>torque TQ2). As a result, the EGR rate is forcibly reduced. Also, the boundary on the drive cam (see the boundary (I), the boundary (II) in FIG. 12) is changed, and the small cam region is enlarged. As a result, the drive cam is switched from large to small.

Figure 14:
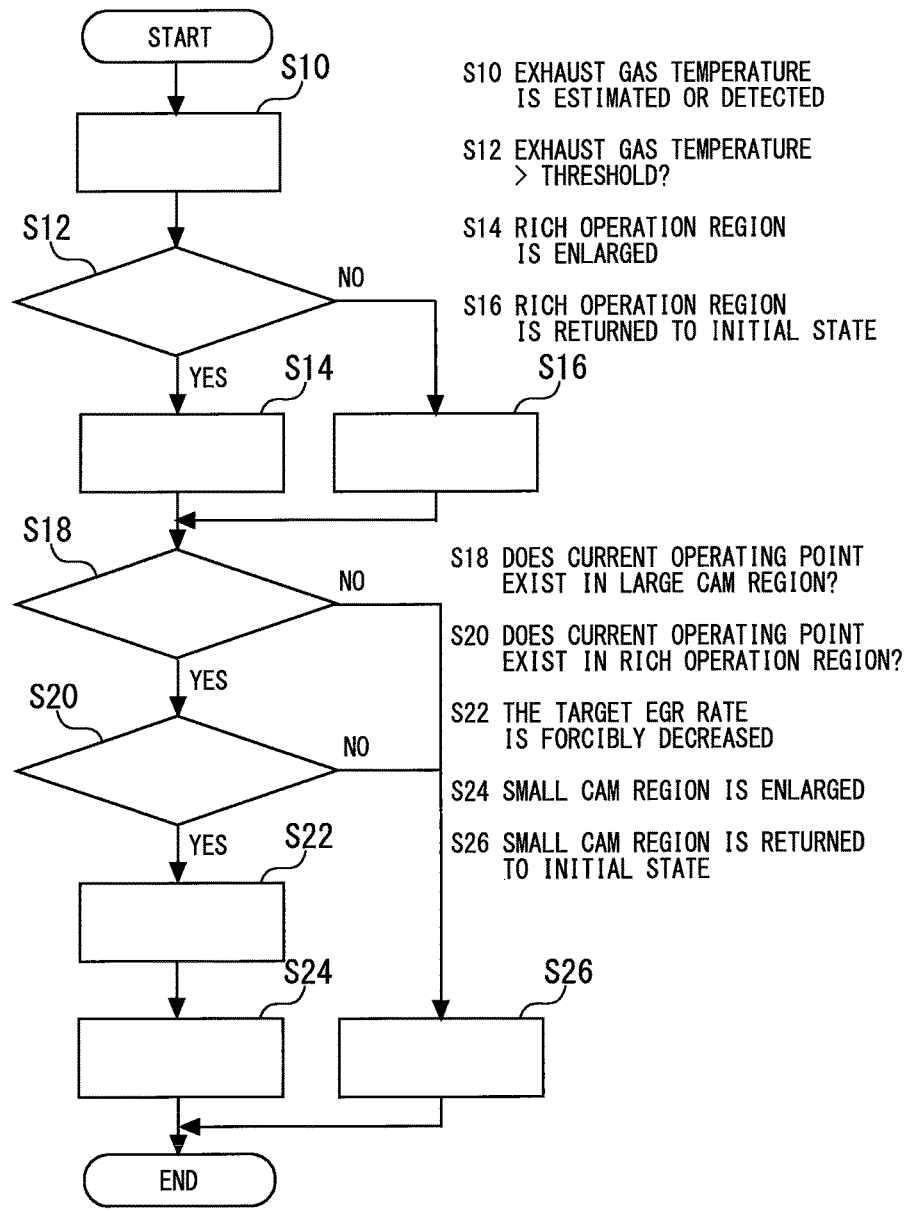
FIG. 14 is a diagram for showing an example of a processing routine executed by an ECU in the first embodiment.

FIG. 14 is a diagram for showing an example of a processing routine executed by an ECU in the first embodiment. This routine is executed at every predetermined control cycle.

In the routine shown in FIG. 14, firstly, the temperature of the exhaust gas is estimated or detected (step S10). In step S10, the ECU estimates the temperature of the exhaust gas from an operation history of the engine. However, the temperature of the exhaust gas can also be directly detected using an exhaust temperature sensor separately provided in the exhaust pipe. The exhaust sensor is provided, for example, on the upstream side of the catalyst 32 shown in FIG. 1.

Subsequent to step S10, it is determined whether or not the temperature of the exhaust gas estimated in step S10 is equal to or greater than a threshold value (step S12). When the determination result of step S12 is positive, the relationship shown in FIG. 10 is changed so that the rich operation region is enlarged (step S14). When the determination result of step S12 is negative, the relationship shown in FIG. 10 is changed so that the rich operation region returns to the initial state (step S16). The "initial state of the rich operation region" means a rich operation region created based on a prior simulation.

In steps S18 and S20, determinations on the current operating point are executed. In step S18, the ECU determines, based on the relationship shown in FIG. 4, whether the current operating point exists in a region (hereinafter also referred to as a "large cam region") for selecting the large cam as the drive cam. In step S20, the ECU determines whether or not the current operating point is in the rich operation region on the basis of the relationship shown in FIG. 10 at the present moment.

When the determination result in step S18 is positive, it can be determined that the current operating point is in the large cam region. When the determination result in step S20 is positive, it can be determined that the current operation point is in the rich operation region. Therefore, when the determination results of steps S18 and S20 are positive, it can be determined that the current operating point is in the overlapped region. Therefore, in this case, the ECU forcibly decreases the target EGR rate in step S22. In addition, in step S24, the ECU changes the relationship shown in FIG. 4 so that the small cam region is enlarged. A specific example of the relationship changing method shown in FIG. 4 is as described in FIG. 12.

When any of the determination results of steps S18 and S20 is negative, it can be determined that the current operating point is not in the overlapped region. Therefore, in this case, the ECU changes the relationship shown in FIG. 4 so that the small cam region returns to the initial state (step S26). The "initial state of the small cam region" means a small cam region created based on the previous simulation.

As described above, according to the routine shown in FIG. 14, when it is determined that the current operating point is in the overlapped region, the target EGR rate is lowered and the small cam is selected as the drive cam. Therefore, it is possible to suppress occurrence of the above-mentioned deposit while suppressing reduction in the engine output.

In the first embodiment described above, the LPL-EGR device 36 shown in FIG. 1 corresponds to the "EGR device" of the first aspect. The catalyst 32 shown in FIG. 1 corresponds to the "exhaust gas purifying catalyst" according to the same aspect. The medium-torque-and-medium-engine-speed region explained in FIGS. 3 to 4 corresponds to the "high EGR operation region" of the same aspect. The high-torque-and-high-engine-speed region corresponds to the "low EGR operation region" of the same aspect. The normal cam corresponds to the "first cam" of the same aspect. The small cam corresponds to the "second cam" of the same aspect. The crank angle section CA1 corresponds to the "first crank angle section" of the same aspect. The crank angle section CA2 corresponds to the "second crank angle section" of the same aspect.

In the first embodiment described above, the control map representing the relationship shown in FIG. 3 corresponds to the "EGR map" of the second aspect. The control map representing the relationship shown in FIG. 10 corresponds to the "air-fuel ratio map" of the same aspect. The control map representing the relationship shown in FIG. 4 corresponds to the "drive cam map" of the same aspect. The region where the large cam is selected as the drive cam is equivalent to the "first cam operation region" of the same aspect. The region where the small cam is selected as the drive cam is equivalent to the "second cam operation region" of the same aspect.

Second Embodiment

Next, a second embodiment of the present disclosure will be described with reference to FIGS. 15 to 19. The basic configuration of the system of this second embodiment is the same as the configuration example described with reference to FIG. 1. Therefore, the description of the common part of the system configuration will be omitted.

Feature of Engine Control of Second Embodiment

Figure 15:
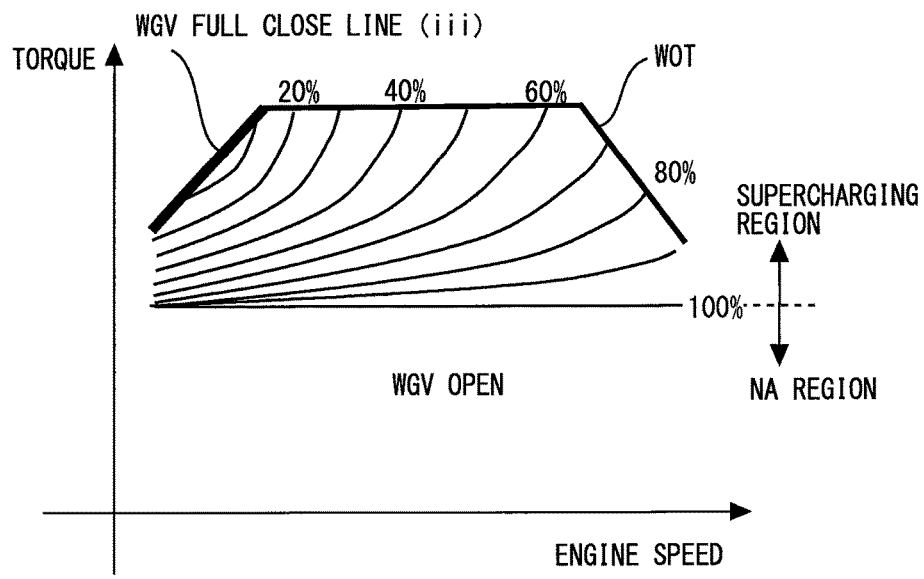
FIG. 15 is a diagram for showing an example of a relationship between an operation region of an engine and an opening degree of a WGV.

In this second embodiment, an opening and closing control of the WGV is performed in addition to the various controls described in the first embodiment. In the opening and closing control, the degree of the opening of the WGV is determined according to the operating condition of the engine. FIG. 15 is a diagram showing an example of a relationship between the operation region of the engine and the opening degree of the WGV. As shown in FIG. 15, the WGV is fully opened (100%) in an NA region on the low torque side (a non-supercharged region). In the supercharging region on the high torque side, the opening degree of the WGV is set smaller as the operating condition of the engine moves toward the high-torque-and-low-engine-speed region. A full close line (iii) where the WGV is fully closed matches a full load line WOT of the low engine speed side. In this second embodiment, the relationship shown in FIG. 15 is stored as a control map in the ROM of the ECU, and the opening degree of the WGV is controlled by applying the actual operating condition to this control map.

However, the positions of the lines defining the respective degrees of opening shown in FIG. 15 are slightly different between the case where the large cam is selected as the drive cam and the case where the small cam is selected as the drive cam. The reason for this is that the inhalation efficiency becomes smaller when the small cam is selected as compared with the case where the large cam is selected. When the inhalation efficiency is small, it is necessary to compensate for response the required load rate by increasing the supercharging pressure. In other words, when the small cam is selected as the drive cam, it is necessary to make the opening degree of the WGV smaller than when the large cam is selected.

Figure 16:
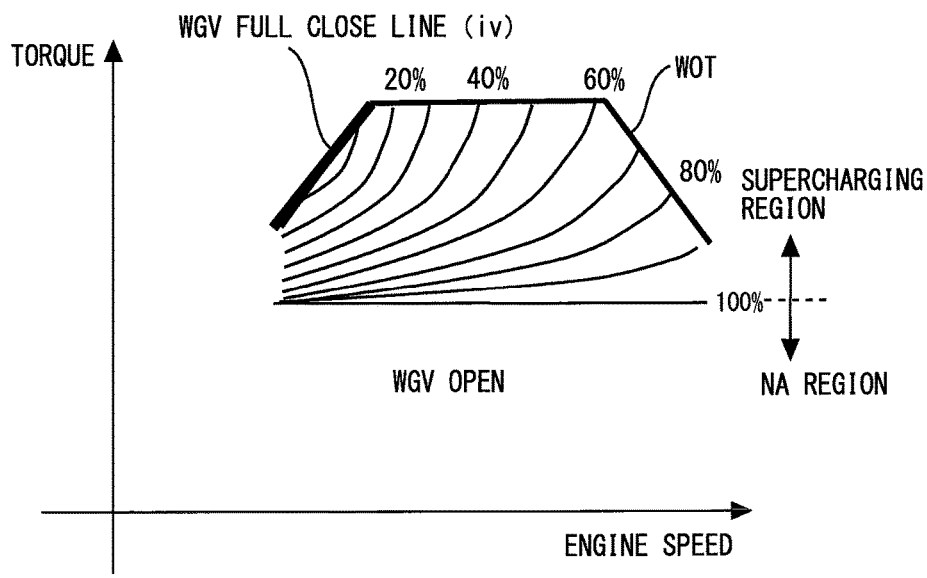
FIG. 16 is a diagram for showing an alternative example of the relationship between the operation region of the engine and the opening degree of the WGV.

FIG. 16 is a diagram for showing alternative example of the relationship between the operation region of the engine and the opening degree of the WGV. FIG. 16 shows the relationship when the small cam is selected, assuming that the relationship shown in FIG. 15 is established when the large cam is selected. As can be seen by comparing FIG. 15 with FIG. 16, a locational relationship of the full open lines in each Figure is similar to one another. However, the line that defines each opening degree in FIG. 16 is located at a higher engine speed side than the line that defines each opening degree in FIG. 15.

The operation region between the full close line (iv) of FIG. 16 and the full close line (iii) of FIG. 15 is said to be an operation region in which supercharging work is limited when the small cam is selected as the drive cam. This is because this operation region is a region that the supercharging pressure is needed to rise to respond to the required load rate despite being a lower engine speed side than the full close line (iv). For this reason, the small cam region is not provided at the low engine speed side in the first embodiment.

Figure 17:
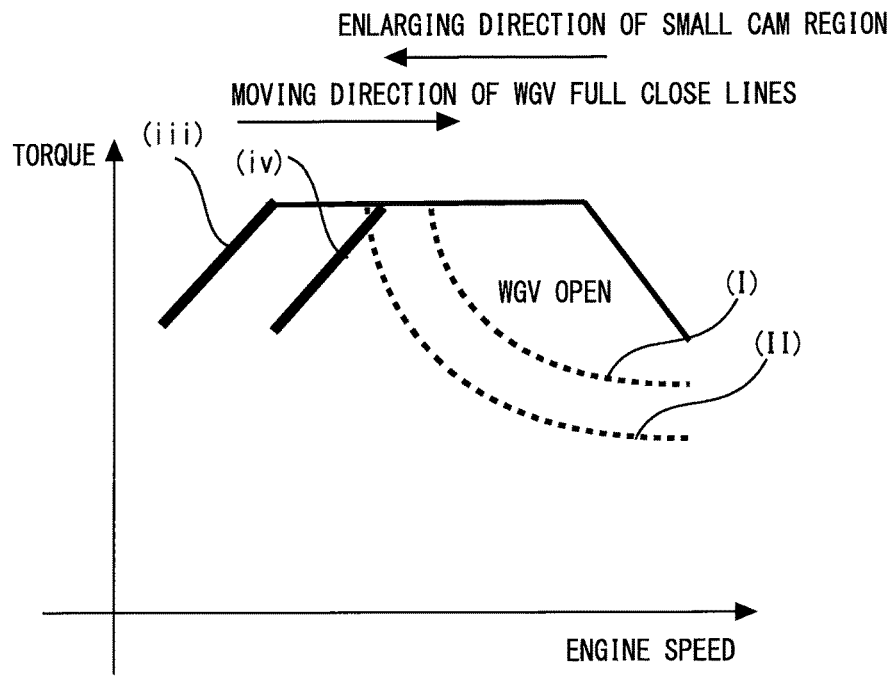
FIG. 17 is a diagram for describing a problem when changing the boundary of drive cam according to the control of the first embodiment.

In the engine control of the first embodiment, the boundary on the drive cam was changed to the low engine speed side. Therefore, when the changed boundary on the drive cam is located at the lower engine speed side than the full close line (iv) shown in FIG. 16, the supercharging work is restricted. FIG. 17 is a diagram for describing a problem when the changed boundary on the drive cam according to the engine control of the first embodiment. In FIG. 17, the full close lines (iii) and (iv) described in FIGS. 15 and 16 are drawn with solid lines. In FIG. 17, the boundaries (I) and (II) related to the drive cam described with reference to FIG. 4 are drawn with broken lines. Assume that a boundary on the drive cam is changed from the boundary (I) to the boundary (II). Then, after changing the boundary, the small cam region is located at the lower engine speed side than the full close line (iv) in a region close to the full load line WOT.

Figure 18:
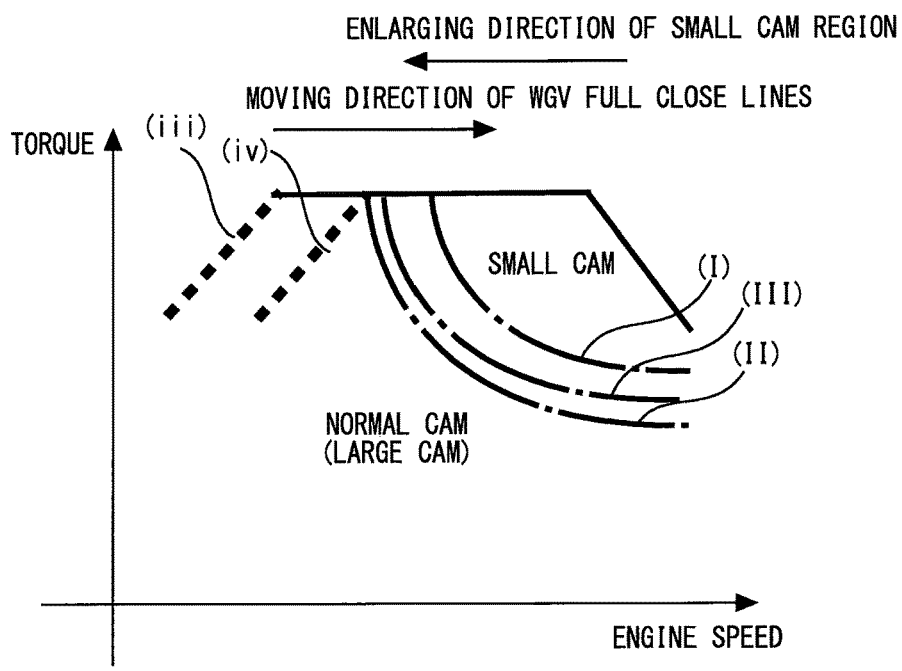
FIG. 18 is a diagram for describing an adjusting method of a boundary with respect to a drive cam in a second embodiment of the present disclosure.

Therefore, in the second embodiment, when executing the engine control of the first embodiment, the boundary related to the drive cam is adjusted so as to be located at a higher engine speed side than the full close line (iv). FIG. 18 is a diagram for describing an adjusting method of the boundary on the drive cam in the second embodiment. In FIG. 18, the full close lines (iii) and (iv) described in FIG. 17 are drawn with broken lines, the boundaries (I) and (II) are drawn as dashed lines. In this second embodiment, when it is determined that the boundary (II) on the drive cam intersects with full close line (iv), the boundary on the drive cam is corrected to a boundary (III) which is located at the high engine speed side.

Thus, in the engine control of this second embodiment, the positional relationship between the boundaries (the boundaries (I) and (III)) and the full close lines on the drive cam (the full close lines (iii) and (iv)) is changed is maintained before and after the boundary on the drive cam. By maintaining the positional relationship like this, it is possible to avoid that the small cam region is located at the lower engine speed side than the full close line (iv). That is, it is possible to avoid restricting the supercharging work after changing the boundary on the drive cam.

Figure 19:
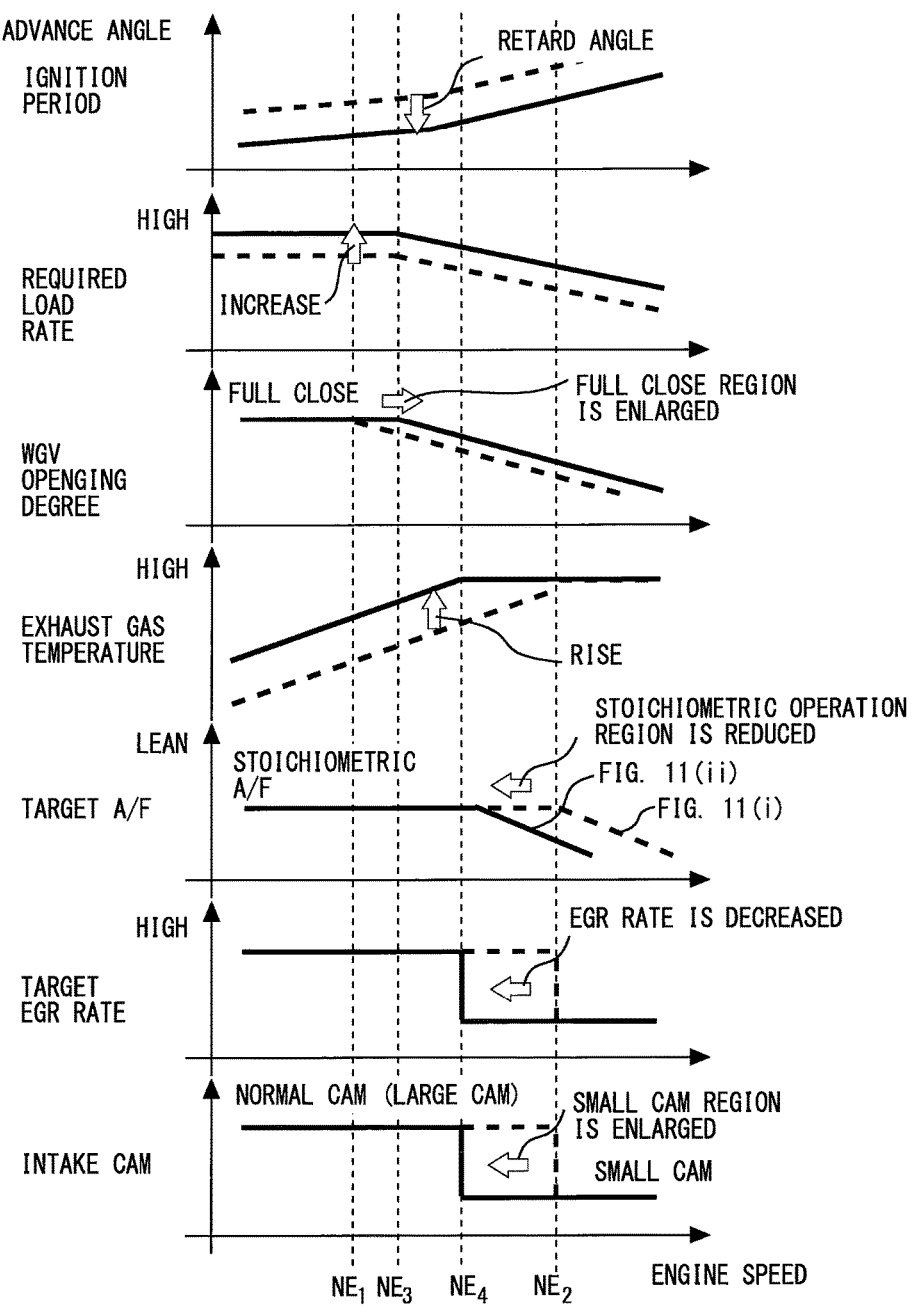
FIG. 19 is a diagram for describing an engine control example of the second embodiment.

A specific example of the control of the second embodiment will be described with reference to FIG. 19. FIG. 19 is a diagram for describing an engine control example according to the second embodiment. FIG. 19 shows the transition of various physical quantities and control parameters when the operating condition of the engine shifts in the engine speed increasing direction under the operating condition where torque is fixed. In the example shown in FIG. 19, the premise engine control, the air-fuel ratio control, the KCS control, and the engine control of the first embodiment are appropriately performed in parallel with the engine control of the second embodiment.

The difference between the broken line and the solid line in FIG. 19 lies in the presence or absence of the execution of the engine control of the first embodiment. The broken line in FIG. 19 shows an example of control when the first embodiment is not executed. In this broken line example, the WGV is opened when the engine speed has risen to the speed NE1. Also, when the engine speed rises to the speed NE2, the target EGR rate is reduced and the drive cam is switched to the small cam. The change in the target EGR rate and the switch of the drive cam are executed based on the premise engine control.

The solid line shown in FIG. 19 represents an example of engine control when the first embodiment is executed. In this solid line example, the ignition period is retarded by the KCS control as the knocking is detected. Also, as the ignition period retards, the required load rate increases. When the control of the first embodiment is executed, the small cam region enlarges to the low engine speed side associated with the rich operation region enlarges. In this example of solid line, the WGV is opened when the engine speed has risen to speed NE3. The fully closed state of the WGV is continued up to the speed NE3 because the full close line has moved to the high rotational speed side.

In this solid line example, further, the target EGR rate is forcibly reduced when the engine speed has increased to the speed NE4, and the drive cam is switched from large to small. The change of the target EGR rate and the switch of the drive cam are executed based on the engine control of the first embodiment. The reason why the change of the target EGR rate and the switch of the drive cam are performed at this stage is because the engine control of this second embodiment is performed. By performing the engine control of the second embodiment, it is avoided that the target EGR rate is forcibly changed and the drive cam is switched at the lower engine speed side than the speed NE3.

In the second embodiment described above, the control map representing the relationship shown in FIGS. 15 and 16 corresponds to the "opening degree maps" of the third aspect. The control map representing the relationship shown in FIG. 16 corresponds to the "opening degree map for the second cam" of the same aspect.

OTHER EMBODIMENT

In the first embodiment described above, the enlargement of the rich operation region was determined based on the temperature of the exhaust gas (see step S12 of FIG. 14). However, instead of the temperature of the exhaust gas, a parameter which has a correlation with the temperature of the exhaust gas may be used to determine the enlargement such as a cooling water temperature, an oil temperature, a learning value of the KCS control, pressure in the cylinder, the back pressure, the hydraulic pressure of oil jet, an alcohol concentration in the fuel.

What is claimed is:
1. A control device for an internal combustion engine which is configured to control an engine, the engine comprising:
   two types of intake cams for driving an intake valve;
   a turbocharger including an exhaust turbine and an intake compressor;
   an exhaust gas purifying catalyst which is provided on a downstream of the exhaust turbine;
   an EGR device which is configured to introduce exhaust gas on the downstream side of the exhaust gas purifying catalyst into an upstream side of the intake compressor as an external EGR gas; and
   an ignition device which is configured to ignite air-fuel mixture in a cylinder,
   wherein the control device is configured to, based on an operation condition of the engine which is specified by engine torque and engine speed, set a target EGR rate and a target air-fuel ratio and select from the intake cams a drive cam for the intake valve,
   wherein the control device is further configured to, when the engine is operated in a high EGR operation region where the target EGR rate is set to a predetermined high EGR rate:
   select a first cam as the drive cam; and
   set a closing timing of the intake valve to a first crank angle section including a crank angle at which inhalation efficiency is the highest under a condition where engine speed and supercharging pressure are fixed,
   wherein the control device is further configured to, when the engine is operated in a low EGR operation region where is located on a higher torque and higher engine speed side relative to the high EGR operation region and the target EGR rate is set to a lower rate than the predetermined high EGR rate:
   select a second cam as the drive cam which has smaller operation angle and smaller lift amount than those of the first cam;
   set the closing timing of the intake valve to a second crank angle section which is located on an advanced side relative to the first crank angle section and whose inhalation efficiency is lower than that during the first crank angle section; and
   change an ignition period of the ignition device to an advance period relative to the ignition period which is set when the engine is operated in the high EGR operation region, wherein the control device is further configured to, when the engine is operated in an operation region where the high EGR operation region is overlapped with a rich operation region where the target air-fuel is set to a rich value:

change the target EGR rate to a lower value than the predetermined high EGR rate;

select the second cam as the drive cam;

set the closing timing to the second crank angle section; and change the ignition period to the advance period.

2. The control device according to claim 1, wherein the control device comprising:

an EGR map in which the high EGR operation region and the low EGR operation region are associated with the operation condition of the engine;

an air-fuel ratio map in which the rich operation region and a stoichiometric operation region where the target air-fuel ration is set to a stoichiometric ratio are associated with the operation condition of the engine; and a drive cam map in which a first cam operation region where the first cam is selected as the drive cam and a second cam operation region where the second cam is selected as the drive cam are associated with the operating condition of the engine, wherein the control device is further configured to:

determine, when the EGR map is superimposed on the air-fuel ratio map, whether or not the rich operation region overlaps with the high EGR operation region; and change, when it is determined that the rich operation region overlaps with the high EGR operation region, a cam boundary between the first cam operation region and the second cam operation region so that all of the rich operation region fall within the second cam operation region.

3. The control device according to claim 2, wherein the engine further comprising a waste gate valve which is provided on a bypass pipe of the exhaust turbine, wherein the control device further comprising opening degree maps in which an opening degree of the waste gate valve is associated with the opening condition of the engine, wherein the opening degree maps are set for the first cam and the second cam, each of the opening degree maps includes full close lines for specifying the waste gate valve to be fully closed, wherein the control device is further configured to change, when it is determined that the rich operation region overlaps with the high EGR operation region, the cam boundary so that all of the rich operation region fall within the second cam operation region and also so that the cam boundary locates at a lower engine speed side relative to the full close line of the opening degree map for the second cam.

* * * * *